United States Patent
Higo

(10) Patent No.: US 7,590,336 B2
(45) Date of Patent: Sep. 15, 2009

(54) IMAGE STABILIZER

(75) Inventor: Akira Higo, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 372 days.

(21) Appl. No.: 11/248,576

(22) Filed: Oct. 13, 2005

(65) Prior Publication Data

US 2006/0083502 A1    Apr. 20, 2006

(30) Foreign Application Priority Data

Oct. 14, 2004    (JP) .............................. 2004-300120

(51) Int. Cl.
G03B 17/00    (2006.01)

(52) U.S. Cl. .................. 396/55; 348/208.99; 348/208.1; 348/208.4; 348/208.5; 348/289; 348/290

(58) Field of Classification Search .................. 396/55, 396/52–53; 348/208.99, 208.1–208.5, 235, 348/289–290, 342, 354; 324/76.39, 76.41, 324/123 R, 124, 128
See application file for complete search history.

(56) References Cited

U.S. PATENT DOCUMENTS

| | | | | |
|---|---|---|---|---|
| 4,713,697 A * | 12/1987 | Gotou et al. | ............. | 348/208.7 |
| 5,355,419 A * | 10/1994 | Yamamoto et al. | ............. | 381/86 |
| 5,566,365 A * | 10/1996 | Yokoya et al. | ............... | 455/307 |
| 5,583,597 A * | 12/1996 | Enomoto | ..................... | 396/55 |
| 5,745,799 A | 4/1998 | Morofuji | | |
| 5,973,319 A * | 10/1999 | Washisu | ................. | 250/231.13 |
| 6,009,279 A * | 12/1999 | Kai et al. | ...................... | 396/55 |
| 6,035,134 A * | 3/2000 | Sato et al. | ..................... | 396/55 |
| 6,097,896 A * | 8/2000 | Usui | ............................ | 396/55 |
| 6,173,121 B1 * | 1/2001 | Tomita et al. | .................. | 396/52 |
| 6,233,009 B1 * | 5/2001 | Morofuji et al. | ......... | 348/208.8 |
| 6,296,093 B1 * | 10/2001 | Norris et al. | ................ | 188/378 |
| 6,414,715 B1 | 7/2002 | Sato | | |
| 6,734,902 B1 * | 5/2004 | Kawahara | ................. | 348/208.8 |
| 6,778,768 B2 | 8/2004 | Ohkawara et al. | | |
| 6,933,968 B2 * | 8/2005 | Yamazaki | .............. | 348/208.12 |
| 7,355,631 B2 * | 4/2008 | Kumaki | ................. | 348/208.99 |
| 2002/0054213 A1 | 5/2002 | Kawahara et al. | | |

(Continued)

FOREIGN PATENT DOCUMENTS

JP    5-142614 A    6/1993

(Continued)

*Primary Examiner*—Melissa J Koval
*Assistant Examiner*—Linda B Smith
(74) *Attorney, Agent, or Firm*—Birch, Stewart, Kolasch & Birch, LLP

(57) ABSTRACT

The present invention provides an image shake correcting apparatus including a shake signal output device, an image displacing device, and an image shake correcting device, comprising: a pan/tilt detecting device which detects panning or tilting of said optical system; an image shake correction stopping device which stops image shake correction by said image shake correcting device when said panning or tilting has been detected; a pan/tilt end detecting device which detects the end of said panning or tilting; an image shake correction restarting device which causes said image shake correcting device to resume image shake correction when the end of said panning or tilting has been detected; and an object frequency band altering device which raises, for a prescribed length of time after the resumption of said image shake correction, the cutoff frequency on the low frequency side of the frequency band covered by said image shake correction.

5 Claims, 4 Drawing Sheets

U.S. PATENT DOCUMENTS

2003/0117912 A1 * 6/2003 Yoshimi et al. .......... 369/44.28

FOREIGN PATENT DOCUMENTS

| | | |
|---|---|---|
| JP | 5-323436 A | 12/1993 |
| JP | 6-197262 A | 7/1994 |
| JP | 9-093483 A | 4/1997 |
| JP | 9-326955 A | 12/1997 |
| JP | 10-213832 A | 8/1998 |
| JP | 2002-229089 A | 8/2002 |

* cited by examiner

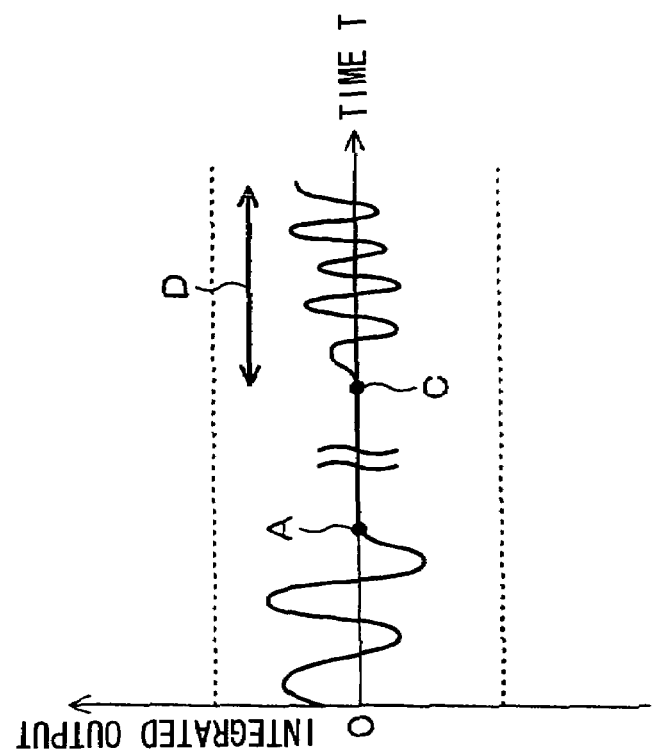
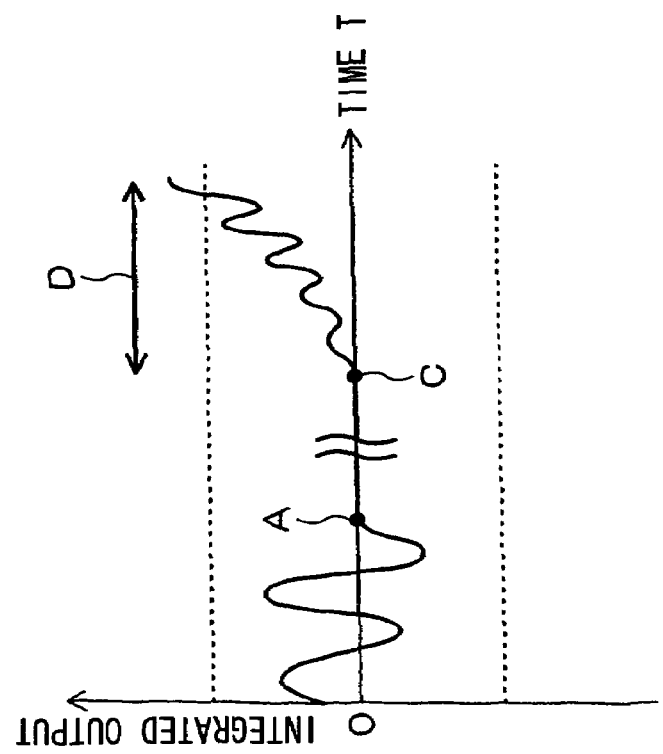

IMAGE STABILIZER

BACKGROUND OF THE INVENTION

1. Field of the Invention

The present invention relates to an image shake correcting apparatus, and more particularly to an image shake correcting apparatus for correcting (preventing) shakes of images picked up by a camera.

2. Description of the Related Art

Known image shake correcting apparatuses for use in television cameras include one in which an anti-shake lens is movably arranged in a photographic optical system within a plane orthogonal to the optical axis and, when any vibration works on the camera (the photographic optical system of the camera), the anti-shake lens is driven by an actuator in a direction to cancel that vibration to correct any image shake that may occur. In such an image shake correcting apparatus, the vibration working on the camera is detected by a shake detection sensor (angular velocity sensor, acceleration sensor or the like), and the displacement of the anti-shake lens is determined to correct the image shake on the basis of a signal supplied from that shake detection sensor (see Japanese Patent Application Laid-Open No. 2002-229089 for instance).

Incidentally, shake signals issued by the shake detection sensor may include not only signals warning against vibrations to be corrected, such as accidental manual shakes but also signals resulting from the photographer's intentional camera manipulation, such as panning or tilting. Therefore, if the anti-shake lens is driven merely in response to a shake signal, image shake correction will be done even when the camera is panned or tilted on purpose. However, unpreferably, if image shake correction is done against panning/tilting, an image shake (reactionary shake) will occur after the panning/tilting is ended, inviting an odd feeling in the camera operation or the image picked up.

In view of this problem, a way of correcting such a reactionary shake is proposed, in which it is automatically judged whether or not a shake signal issued by the shake detection sensor is due to panning/tilting. If the signal is judged to be due to panning/tilting, the image shake correction is stopped, the anti-shake lens is returned to the center of its movable range (the reference position where the displacement is 0) and kept there unmoving (see Japanese Patent Application Laid-Open No. 5-142614 for instance).

It has to be noted that, at the end of panning/tilting, the pertinent shake signal does not immediately fall to exactly zero but gradually approaches zero on account of an abrupt change in the angular velocity or acceleration of the camera, a residual signal in a capacitor in the circuit or the like. Consequently, when image shake correction is resumed, the anti-shake lens is substantially moved by this shake signal, resulting in a reactionary shake of the image. Such a reactionary shake makes impossible accurate and prompt framing.

As a technique to prevent such a reactionary shake, Japanese Patent Application Laid-Open No. 10-213832 discloses an optical device with an image shake correcting function, provided with gain altering means which alters the gain of the shake output signal in response to the detection of the end of panning. Incidentally, the technique disclosed in this Japanese Patent Application Laid-Open No. 10-213832 is to alter the gain of the shake output signal, and differs in the concept of configuration from the present invention.

SUMMARY OF THE INVENTION

An object of the invention, attempted in view of these circumstances, is to provide an image shake correcting apparatus which reduces any reactionary shake of the image that may occur after the end of panning or tilting.

In order to achieve the object stated above, an image shake correcting apparatus according to a first aspect of the invention includes a shake signal output device which supplies a shake signal corresponding to a vibration working on an optical system; an image displacing device which displaces an image formed by the optical system; and an image shake correcting device which causes the image displacing device to so displace the image as to cancel any image shake due to the vibration working on the optical system on the basis of the shake signal supplied by the shake signal output device, and is characterized by comprising a pan/tilt detecting device which detects panning or tilting of the optical system; an image shake correction stopping device which stops image shake correction by the image shake correcting device when the panning or tilting has been detected; a pan/tilt end detecting device which detects the end of the panning or tilting; an image shake correction restarting device which causes the image shake correcting device to resume image shake correction when the end of the panning or tilting has been detected; and an object frequency band altering device which raises, for a prescribed length of time after the resumption of the image shake correction, the cutoff frequency on the low frequency side of the frequency band covered by the image shake correction.

The image shake correcting apparatus according to the first aspect of the invention can reduce any reactionary shake that may occur when panning/tilting has ended because, when the end of panning/tilting is detected, the frequency band of shake signals to be corrected is altered.

An image shake correcting apparatus according to a second aspect of the invention is a version of the apparatus according to the first aspect wherein the object frequency band altering device reduces, by a prescribed value at a time at prescribed intervals of time, the cutoff frequency on the low frequency side of the frequency band covered by the image shake correction.

In the image shake correcting apparatus according to the second aspect of the invention, at the end of panning/tilting, the shake signal does not immediately fall to exactly zero but gradually approaches zero on account of an abrupt change in the angular velocity or acceleration of the camera, a residual signal in a capacitor in the circuit or the like. Matched with this gradual approach of the shake signal to zero, the cut-off frequency is lowered stepwise, and accordingly the DC component of the shake signal can be appropriately cut, enabling image shake correction to be processed in the right way.

As described above, since the image shake correcting apparatus according to the invention varies the frequency band of shake signals to be covered by image shake correction when the end of panning/tilting has been detected, the reactionary shake of the image occurring at the end of panning/tilting can be reduced.

BRIEF DESCRIPTION OF THE DRAWINGS

FIGS. 3A and 3B are graphs schematically showing integrated outputs; and

DETAILED DESCRIPTION OF THE PREFERRED EMBODIMENTS

An image shake correcting apparatus, which is a preferred embodiment of the present invention, will be described in detail below with reference to accompanying drawings.

Figure 1:
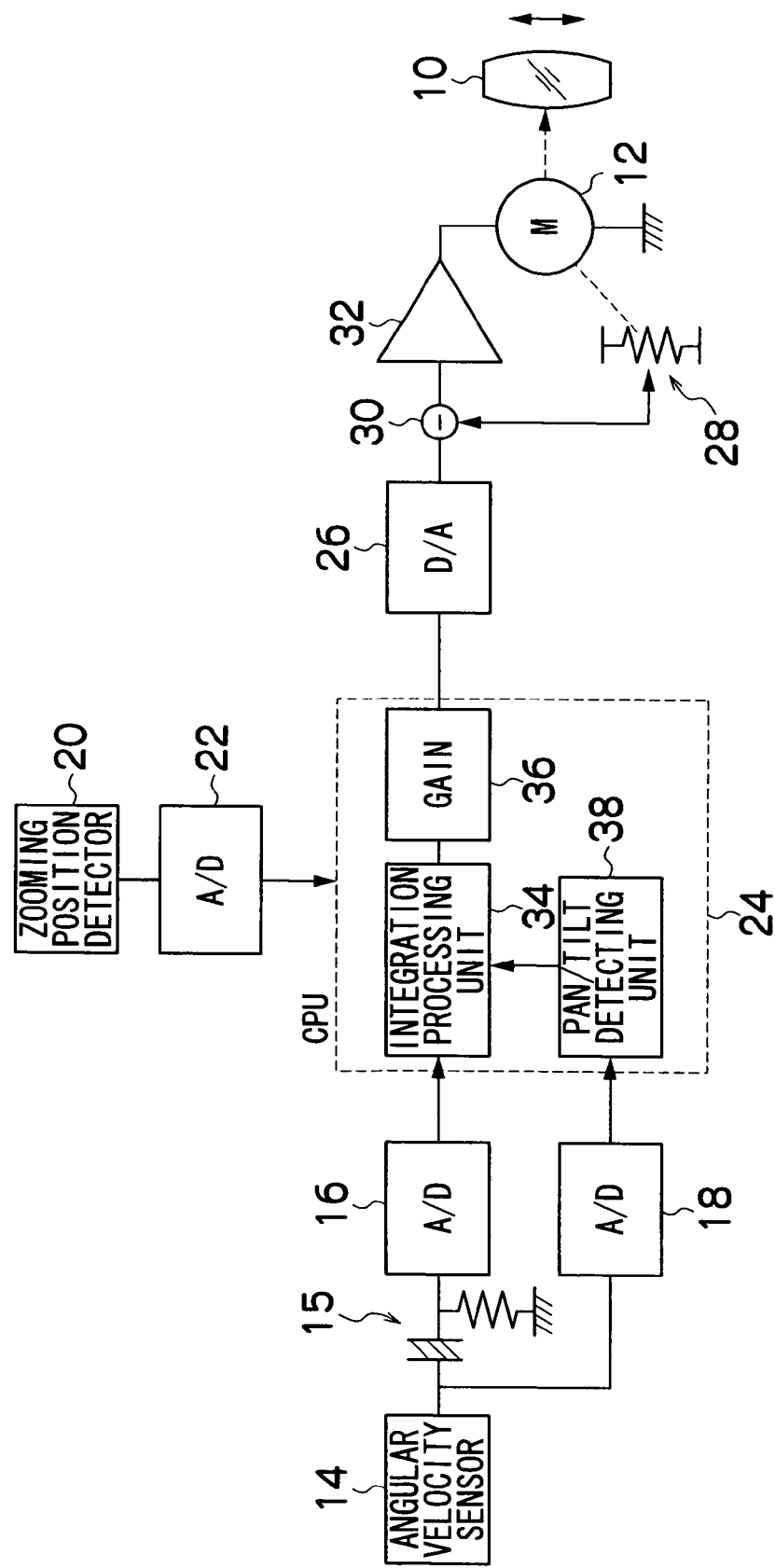
FIG. 1 is a block diagram showing the principal configuration of an image shake correcting apparatus, which is a preferred embodiment of the present invention.

FIG. 1 is a block diagram showing the principal configuration of an image shake correcting apparatus, which is a preferred embodiment of the invention. The image shake correcting apparatus is mounted for instance on the lens device (image pickup lens) of a television camera, a movie camera or a still camera, and an anti-shake lens 10 shown in the diagram is arranged, in the photographic optical system of the lens device or the camera on which this apparatus is mounted, to be movable both up and down (in the vertical direction) and right and left (in the horizontal direction) within a plane orthogonal to the optical axis. Further, the anti-shake lens 10 is driven vertically or horizontally by a motor 12 and, when a vibration occurs in the camera (photographic optical system), is moved by this motor 12 to a position where it can prevent image shaking (position of canceling the vibration). A vertical or horizontal movement of the anti-shake lens 10 displaces the range of the photographic optical system vertically or horizontally, respectively. Further, as the anti-shake lens 10 is similarly driven in both the vertical and horizontal directions on the basis of the vibration occurring in the respective directions, a configuration to perform image shake correction in only one direction (hereinafter the horizontal direction) will be described below with respect to this embodiment, a similar configuration being assumed for the other direction.

An angular velocity sensor 14 shown in FIG. 1 is, for instance, a gyro sensor, and is used as a shake detection sensor for detecting a vibration of the camera. This angular velocity sensor 14, installed on the upper face of the lens barrel, detects the angular velocity of the horizontal vibration of the lens barrel, and supplies an electric signal corresponding to the detected angular velocity. The signal supplied from the angular velocity sensor 14 will be hereinafter referred to as the angular velocity signal.

The angular velocity signal supplied from the angular velocity sensor 14 is branched into two routes, and the signal on one route, after being cleared of low frequency noise by a high pass filter 15, is converted into a digital signal by an A/D converter 16. Then this digital signal is given to a CPU 24. The signal on the other route is converted directly, as the angular velocity signal supplied from the angular velocity sensor 14, is converted into a digital signal by another A/D converter 18 and given to the CPU 24.

The photographic lens in this embodiment is variable in zoom ratio (focal distance). A detection signal of a voltage corresponding to its set position (zooming position) is supplied from a zooming position detector 20 and, after being converted into a digital signal by an A/D converter 22, is given to the CPU 24.

Whereas the processing by the CPU 24 will be described afterwards, a positional instruction signal indicating the target position of the anti-shake lens 10, namely the displacement of the anti-shake lens 10 relative to the reference position, is supplied from the CPU 24 to a D/A converter 26. The positional instruction signal supplied to the D/A converter 26, after being converted into an analog voltage signal, is entered into an adder 30. The reference position of the anti-shake lens 10 is, for instance, the center of its movable range (the center of oscillation), and the signal value indicating that position is supposed to be zero. It is to be noted that the reference position need not be the center of oscillation, though.

As a positional signal indicating the current position of the anti-shake lens 10, a voltage signal from a potentiometer 28 for detecting the rotational position of the motor 12 is given to the adder 30, and a voltage signal indicating the difference between an instruction signal from the CPU 24 and a positional signal from the potentiometer 28 is generated. That voltage signal is given to an amplifier (servo amplifier) 32.

The amplifier 32 amplifies the voltage signal given by the adder 30 with a prescribed gain, and applies the amplified signal to the motor 12. This causes the motor 12 to be so driven as to reduce the voltage signal given by the adder 30 to be reduced to zero, and the anti-shake lens 10 moves to a position instructed by a positional instruction signal from the CPU 24.

Next, the processing by the CPU 24 will be described. The block of the CPU 24 shown in FIG. 1 comprises functional blocks for different modes of processing to be accomplished by the CPU 24, and the processing by the CPU 24 will be described in terms of the different modes of processing to be accomplished by the functional blocks.

In the CPU 24, the angular velocity signal given by the A/D converter 16 undergoes extraction of only low-frequency components by an integration processing unit 34. This corresponds to the processing to integrated angular velocity signals.

The integration processing unit 34 can vary integration characteristics (filter characteristic and frequency characteristic) by altering parameters, and is enabled to vary the frequency characteristic (the cutoff frequency fc on the integration processing unit 34 side) by controlling the characteristics of a pan/tilt detecting unit 38. Incidentally, the frequency characteristic of the integration processing unit 34 may be varied by, for instance, providing a plurality of integration processing units having different frequency characteristics, and switching the integration processing unit into which the angular velocity signal is to be entered on the basis of the condition described later.

A signal having passed the integration processing unit 34 is amplified by a gain unit 36 with a prescribed gain, and the amplified signal is supplied to a D/A converter 26 as the positional instruction signal. To add, the gain in the gain unit 36 is set to a value matching the zooming position obtained from the zooming position detector 20.

The processing by the CPU 24 described above provides the positional instruction signal indicating the position of the anti-shake lens 10, namely the displacement relative to the center of oscillation of the anti-shake lens 10 for correcting (preventing) image shaking against the vibration working on the camera, on the basis of the angular velocity signal given by the A/D converter 16, and this positional instruction signal is supplied to the D/A converter 26.

On the other hand, the angular velocity signal given by the A/D converter 18 is read by the pan/tilt detecting unit 38. The pan/tilt detecting unit 38 having read the angular velocity signal detects the performance and end of panning/tilting on the basis of that angular velocity signal.

Figure 2:
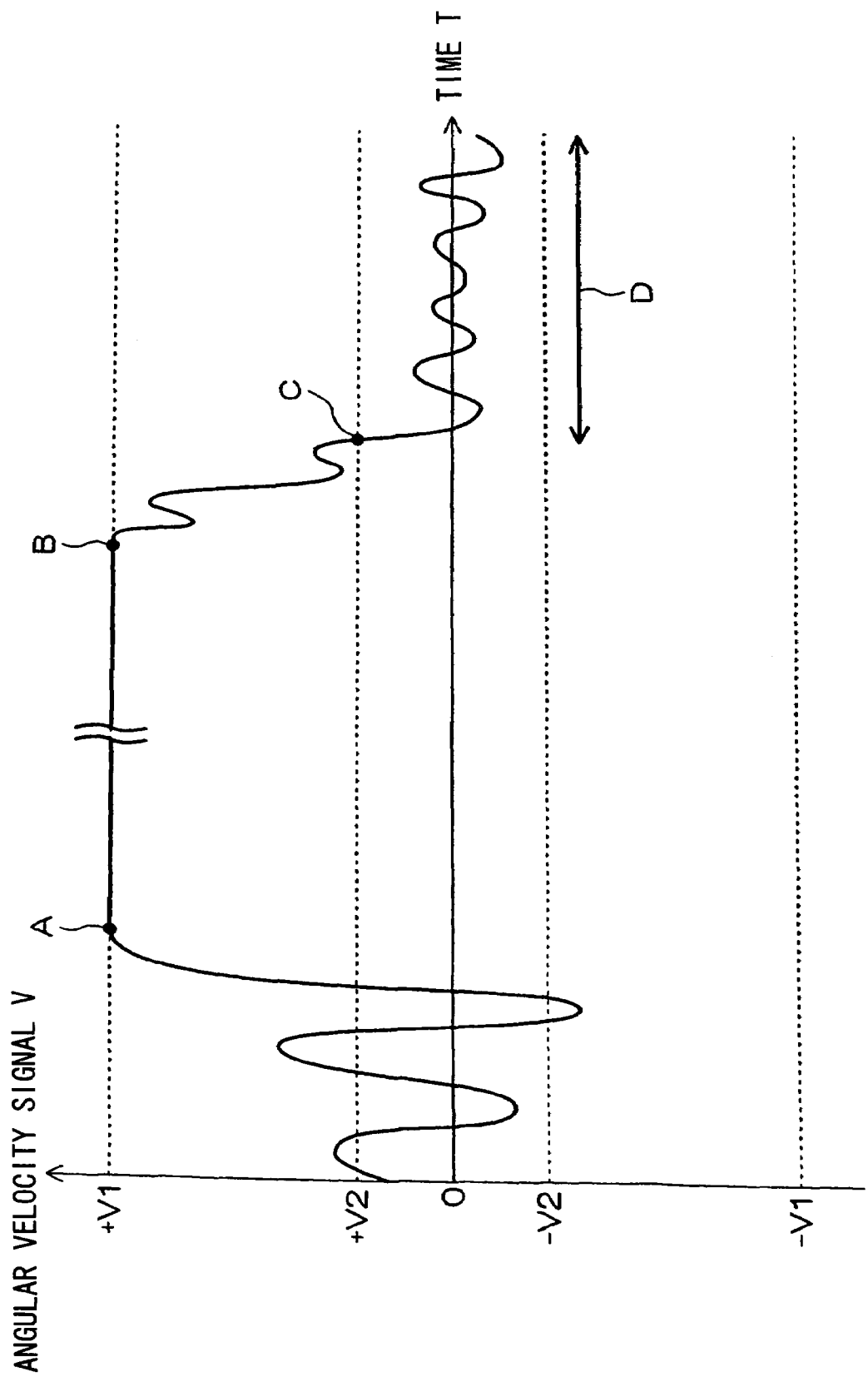
FIG. 2 is a graph schematically showing an angular velocity signal.

FIG. 2 is a graph schematically showing the angular velocity signal. In FIG. 2, the horizontal axis represents the time elapsed t and the vertical axis, the angular velocity signal V.

Point A in the graph is the starting point of panning/tilting, and point C, the point where the end of panning/tilting is detected.

For instance, when the absolute value of the angular velocity signal V obtained from the A/D converter 18 is greater than a prescribed threshold V1 (V<−V1, V>+V1), a value of the threshold +V1 (or −V1) is supplied as in the section from point A to point B in FIG. 2. The pan/tilt detecting unit 38 judges that the angular velocity signal is due to panning/tilting, namely that panning/tilting has been performed. When the absolute value of the angular velocity signal V obtained from the A/D converter 18 falls below a prescribed threshold V2 as at point C in FIG. 2 (−V2<V<+V2) after the detection of panning/tilting, the pan/tilt detecting unit 38 judges that the panning/tilting has ended.

As described above, when panning/tilting has been detected by the pan/tilt detecting unit 38, processing to stop image shake correction is executed. Thus, the integration characteristics of the integration processing unit 34 are varied. Hereupon the integration processing unit 34, if panning/tilting is detected by a filter capable of varying integration characteristics in response to parameter alteration, undergoes a variation in integration characteristics which cause the anti-shake lens 10 to return to its reference position (the center of oscillation) and stop there. Thus, the integration characteristics are so varied as to bring the value of the positional instruction signal gradually closer to 0. The integration characteristics during the execution of image shake correction are supposed to be the normal characteristics. When the integration characteristics are to be varied from the normal integration to the different characteristics to return the anti-shake lens 10 to its reference position, the value of the zoom positional signal given by the zooming position detector 20 is taken into account.

Then, if the end of panning/tilting is detected by the pan/tilt detecting unit 38, processing to resume image shake correction is executed. Thus, the integration characteristics of the integration processing unit 34 are varied, and the cutoff frequency fc takes on a prescribed value f0. The value f0 here is supposed to be large enough to cut the DC component contained in angular velocity signal, attributable to any abrupt change in the angular velocity or acceleration of the camera, a residual signal in a capacitor in the circuit or the like (for instance about 3 Hz). The pan/tilt detecting unit 38 sets the cutoff frequency fc to the target integration characteristic (target value f1) by reducing the frequency stepwise after the lapse of every prescribed length of time t0 by a prescribed value fi at a time. The target value f1 is, for instance, f1≈0.02 Hz.

FIGS. 3A and 3B are graphs schematically showing integrated outputs. In FIGS. 3A and 3B, the horizontal axis represents the time elapsed t and the vertical axis, the integrated output. Points A and C and section D of FIGS. 3A and 3B correspond to respectively the same points or duration of time in FIG. 2.

As indicated by section D in FIG. 2, after the end of panning/tilting, the angular velocity signal V does not immediately fall to exactly zero but gradually approaches zero on account of an abrupt change in the angular velocity or acceleration of the camera, a residual signal in a capacitor in the circuit or the like. Immediately after the end of panning/tilting, as image shake correction is resumed and these angular velocity signals are integrated by the integration processing unit 34, the integrated output abruptly rises as shown in section D of FIG. 3A. As a consequence, the integrated output may sometimes go beyond the movable range of the anti-shake lens 10 (indicated by broken lines above and below the axis of time t in the graphs). On the other hand, as the cutoff frequency fc of the integration processing unit 34 on the low frequency side is reduced stepwise along with the approach of the angular velocity signal in section D to zero, appropriate image shake correction can be accomplished entailing no abrupt rise in integrated output as shown in section D of FIG. 3B.

Figure 4:
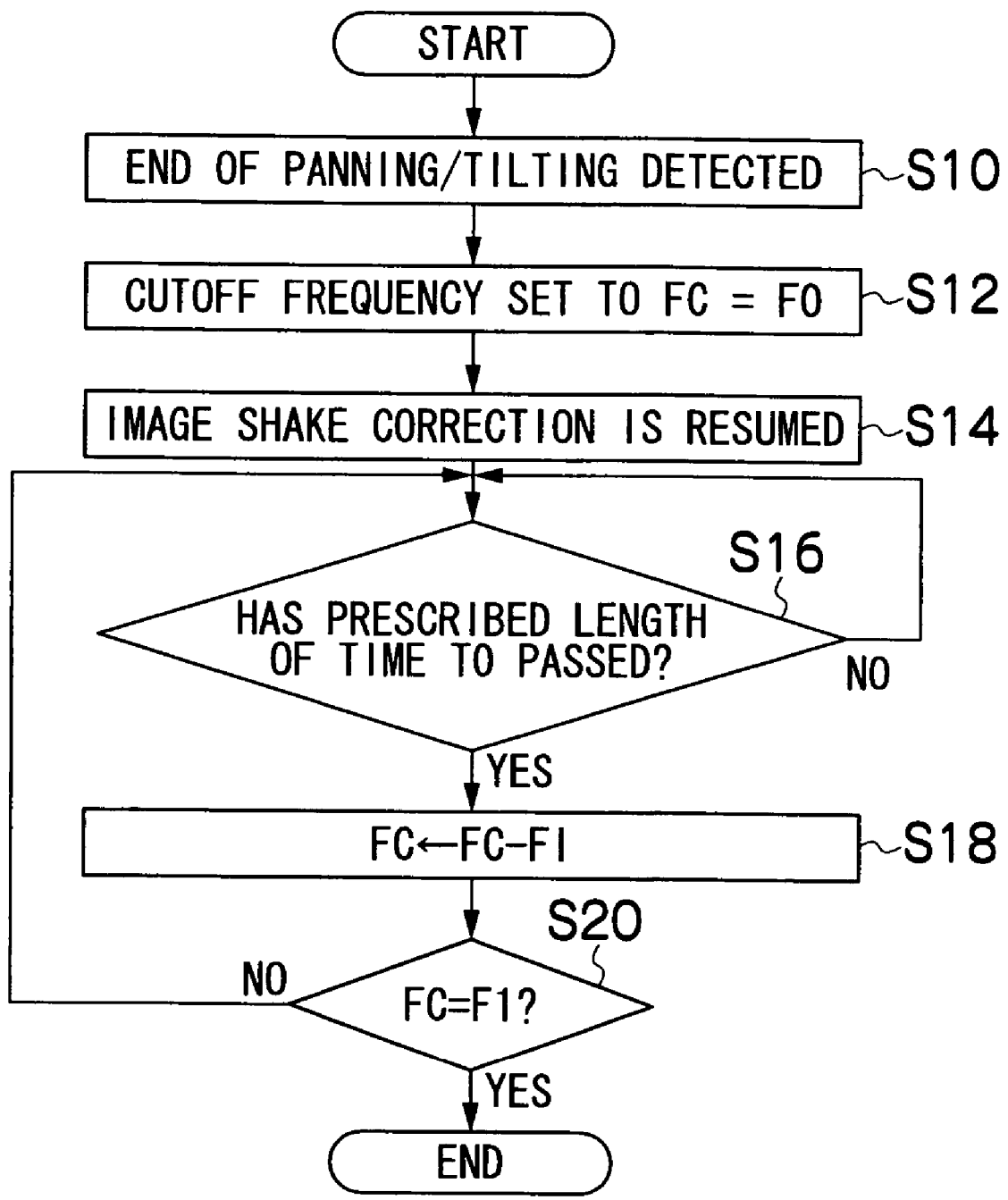
FIG. 4 is a flow chart of processing to resume image shake correction at the end of panning/tilting.

FIG. 4 is a flow chart of processing to resume image shake correction at the end of panning/tilting. First, when the end of panning/tilting is detected by the pan/tilt detecting unit 38 (step S10), characteristics control by the pan/tilt detecting unit 38 causes the cutoff frequency fc of the integration processing unit 34 to be set to fc=f0 (for instance about f0≈3 Hz) (step S12), and image shake correction is resumed (step S14). Next, every time a prescribed length of time t0 passes (step S16), the value of the cutoff frequency fc is reduced by a prescribed value fi at a time (step S118). The prescribed length of time t0 here is about 0.2 second, and the interval fi of reducing the cutoff frequency fc is about 0.5 Hz. These t0 and fi may be variables, to be set to appropriate values according the velocity of the angular velocity signal approaching zero in section D. Then, as the value fc of the cutoff frequency is reduced from 3.0 Hz to 2.5 Hz . . . 1.0 Hz, 0.5 Hz and finally to 0.02 Hz at about 0.2-second intervals and set to the target f1 (for instance 0.02 Hz) (step S20), normal image shake correction is resumed.

Though skipped in the description of this embodiment, angular velocity signals regarding the horizontal and vertical directions are obtained from separate angular velocity sensors. The start and end of panning are detected from the signal of angular velocity in the horizontal direction, and those of tilting, from the signal of angular velocity in the vertical direction.

While the foregoing description of the embodiment referred to prevention of image shaking with an anti-shake lens displaced within a plane orthogonal to the optical axis of the photographic optical system, the invention can be applied to image shake correcting apparatuses of some other systems as well. For instance, the invention can also be applied to an electrical image stabilizer by which the range of cutting out image signals from an image pickup element is shifted to correct image shakes.

Further, whether or not a shake is due to panning/tilting is judged according to whether or not the angular velocity signal has surpassed a prescribed value, the judgment can as well be made according to some other criterion. The same is true of the detection of the end of panning/tilting.

The invention can also be applied to image shake correction elsewhere than in television cameras.

What is claimed is:
1. An image shake correcting apparatus including:
   a shake signal output device which supplies a shake signal corresponding to a vibration working on an optical system;
   an image displacing device which displaces an image formed by said optical system;
   and an image shake correcting device which causes said image displacing device to so displace said image as to cancel any image shake due to the vibration working on said optical system on the basis of the shake signal supplied by said shake signal output device, the apparatus comprising:
   a pan/tilt detecting device which detects panning or tilting of said optical system;
   an image shake correction stopping device which stops image shake correction by said image shake correcting device when said panning or tilting has been detected based upon detection of the degree of vibration of the optical system;

a pan/tilt end detecting device which detects the end of said panning or tilting; an image shake correction restarting device which causes said image shake correcting device to resume image shake correction when the end of said panning or tilting has been detected; and an object frequency band altering device which raises, for a prescribed length of time after resumption of said image shake correction, a cutoff frequency on the low frequency side of the frequency band covered by said image shake correction.

2. The image shake correcting apparatus according to claim 1, wherein said object frequency band altering device reduces, by a prescribed value at a time at prescribed intervals of time, a cutoff frequency on the low frequency side of the frequency band covered by said image shake correction.

3. A method of correcting for image shake in an optical system comprising:

detecting panning or tilting of said optical system, stopping image shake correction by an image shake correction device when panning or tilting has been detected based upon detection of the degree of vibration of the optical system, detecting the end of said panning or tilting, restarting image shake correction when the end of said panning or tilting is detected, and raising the cutoff frequency on the low frequency side of the frequency band covered by said image shake correction for a prescribed length of time after the resumption of said image shake correction.

4. The image shake correcting apparatus according to claim 1, wherein, in the pan/tilt detecting device, when an absolute value of an angular velocity signal is greater than a first threshold, it is judged that the panning or tilting has been performed and when an absolute value of an angular velocity signal after the detection of panning or tilting fails below a second threshold, it is judged that the panning or tilting has ended.

5. A method of correcting for image shake in an optical system according to claim 3, wherein, in the step of detecting the end of said panning or tilting, when an absolute value of an angular velocity signal is greater than a first threshold, it is judged that the panning or tilting has been performed and when an absolute value of an angular velocity signal after the detection of panning or tilting falls below a second threshold, it is judged that the panning or tilting has ended.

* * * * *